US012569078B2

(12) United States Patent
Farinola et al.

(10) Patent No.: US 12,569,078 B2
(45) Date of Patent: Mar. 10, 2026

(54) SELF-CLOSING SECURITY DOOR ASSEMBLY FOR RETAIL DISPLAY

(71) Applicant: VIRA Insight, LLC, Lewisville, TX (US)

(72) Inventors: Nick Farinola, Kinnelon, NJ (US); James W. Waalkes, Grand Rapids, MI (US); Benjamin J. Sahlberg, Grand Rapids, MI (US)

(73) Assignee: VIRA Insight, LLC, Lewisville, TX (US)

( * ) Notice: Subject to any disclaimer, the term of this patent is extended or adjusted under 35 U.S.C. 154(b) by 358 days.

(21) Appl. No.: 18/141,602

(22) Filed: May 1, 2023

(65) Prior Publication Data

US 2024/0365996 A1 Nov. 7, 2024

(51) Int. Cl.
*A47F 3/00* (2006.01)
*E05F 1/16* (2006.01)

(52) U.S. Cl.
CPC ................ *A47F 3/002* (2013.01); *E05F 1/16* (2013.01)

(58) Field of Classification Search
CPC .................................. A47F 3/002; E05F 1/16
USPC ...................................................... 312/138.1
See application file for complete search history.

(56) References Cited

U.S. PATENT DOCUMENTS

| | | | | | |
|---|---|---|---|---|---|
| 4,757,642 | A * | 7/1988 | Hahn | E05F 1/16 49/404 |
| 10,724,285 | B2 * | 7/2020 | Dodge | E05F 5/003 |
| 10,736,438 | B1 * | 8/2020 | Jhaveri | A47B 47/00 |
| 11,147,394 | B2 * | 10/2021 | Vogler | A47F 5/103 |
| 11,375,826 | B2 * | 7/2022 | Hardy | A47B 73/006 |
| 2007/0236111 | A1 * | 10/2007 | Gray | A47B 96/02 312/138.1 |
| 2008/0246375 | A1 * | 10/2008 | Berg | A47B 47/0066 312/265.5 |
| 2012/0285911 | A1 * | 11/2012 | Valiulis | A47F 5/0861 49/404 |
| 2023/0332451 | A1 * | 10/2023 | Eskilsson | E05F 5/003 |

* cited by examiner

*Primary Examiner* — Daniel J Troy
*Assistant Examiner* — Timothy M Ayres
(74) *Attorney, Agent, or Firm* — Warner Norcross + Judd LLP

(57) ABSTRACT

A self-closing door assembly for limiting access to goods displayed on a shelving system. A frame assembly is attached to the shelving system adjacent the front edge of a first shelf, with upper and lower guide rails to slidably engage a pair of overlapping and self-closing doors. The door are aligned to laterally slide open from a closed position at which they interfere with manual access to the goods displayed on the shelf. Springs disposed between the frame assembly and the doors urge the doors toward the closed position. The doors are adapted for manual engagement to be urged toward the open position, and the springs automatically return the doors to the closed position upon manual release thereof.

18 Claims, 10 Drawing Sheets

SECTION A-A

SECTION B-B

SECTION C-C

SELF-CLOSING SECURITY DOOR ASSEMBLY FOR RETAIL DISPLAY

BACKGROUND OF THE INVENTION

Related Applications

None.

Field of the Invention

The present disclosure generally relates to retail merchandise display fixtures. More particularly, the present disclosure relates to self-closing security door assemblies for real shelving fixtures, which interfere with attempts at product-sweeping theft.

Description of Related Art

Shelving display fixtures for consumer products in retail are important for attractive product display, efficient utilization of limited shelf space, convenience for consumers, and for generally incentivizing purchases by consumers. However, in recent years with increasing petty larceny, particularly regarding theft by sweeping large quantities of products from retail shelves, and then quickly absconding with such products before defensive actions can be taken, retailers have a need for shelving systems that both effectively present goods for purchase while controlling mass theft by sweeping.

Some solutions to the foregoing problems in the art are to position goods out of reach of thieves, such as behind a counter, requiring retail sale personnel to retrieve the goods, for example. Another solution is to place the goods in locked cabinets, where a consumer must request assistance of retail sales personnel to open a lock for access. There are also systems the dispense goods one unit at time, using a complex mechanical or electrical arrangement to slow the access to plural units of any given good, and which must be adapted for the size and shape of the goods to be dispensed. These solution fall into two challenging areas, either requiring additional services of the retailer, or requiring a complex dispensing apparatus tailored to the particular goods to be dispensed. Thus it can be appreciated that there is a need in the art for an apparatus the allows consumers to access retail goods on display without the assistance of retail service personal, and which are flexible to present a wide range of goods while still acting as a foil to shelf-sweeping larceny.

SUMMARY OF THE INVENTION

The need in the art is addressed by the apparatuses of the present invention. The present disclosure teaches a self-closing door assembly for limiting access to goods displayed on a shelving system that includes a first shelf with a front edge. The assembly includes a frame assembly that is attached to the shelving system adjacent the front edge of the first shelf, and a guide rail assembly that is positioned in fixed relationship to the frame assembly and aligned in parallel with the front edge of the first shelf. A first door is aligned to laterally engage the guide rail assembly so as to slide between a closed position that interferes with manual access to the goods displayed on the first shelf and an open position that enables manual access to a first fractional portion of the goods displayed on the first shelf, and a first spring disposed between the frame assembly and the first door to urge the first door toward the closed position. And where the first door is adapted for manual engagement to be urged toward the open position, and where the first spring returns the first door to the closed position upon manual release thereof.

In a specific embodiment of the forgoing assembly, the first spring is a coiled-strip constant-force spring retained in position by the frame assembly, and with an end clip extended to engage the first door.

In a specific embodiment of the forgoing assembly, the guide rail assembly further includes a lower guide rail that slidably engages a lower portion of the first door, and an upper guide rail that slidably engages an upper portion of the first door.

In a specific embodiment, the forgoing assembly further includes first and second end panels attached to left and right sides of the frame assembly, respectively, each extending rearwardly to limit access to goods upon the first shelf from left and right sides thereof.

In a specific embodiment, the forgoing assembly further includes a second door aligned to laterally engage the guide rail assembly to slide between a closed position that interferes with manual access to the goods displayed on the first shelf and an open position that enables manual access to a second fractional portion of the goods displayed on the first shelf, and, a second spring disposed between the frame assembly and the second door to urge the second door toward the closed position. And, the second door is adapted for manual engagement to be urged toward the open position, and the second spring returns the second door to the closed position upon manual release thereof.

In a refinement to the foregoing embodiment, the first door overlaps with the second door when urged open, and the second door overlaps with the first door when urged open. In another specific refinement, the first door and the second door are arranged in left-right opposing orientation, and the guide rail assembly includes a first guide rail engaged with the first door, and a second guide rail engaged with the second door.

In a specific embodiment of the forgoing assembly, the first door includes a first lower door portion and a first upper door portion attached to one another in height adjustable fashion to enable adjustment of the first door height according to the shelving system shelf spacing, and, the second door includes a second lower door portion and a second upper door portion attached to one another in height adjustable fashion to enable adjustment of the second door height according to the shelving system shelf spacing.

In a refinement to the forgoing embodiment, the frame assembly further includes a first telescopic side frame that is height adjustable to accommodate a selected height of the first lower door portion attached to the first upper door portion, and a second telescopic side frame that is height adjustable to accommodate a selected height of the second lower door portion attached to the second upper door portion, and where the guide rail assembly further includes a lower guide rail that slidably engages the first lower door portion and the second lower door portion, and an upper guide rail that slidably engages the first upper door portion and the second upper door portion.

In a refinement to the foregoing embodiment, a lower fastener is fixed to the lower guide rail for connecting the lower guide rail to the first shelf.

In another specific embodiment, where the shelving system includes a second shelf located above the first shelf, the assembly further includes an upper fastener fixed to the upper guide rail for connecting the upper guide rail to the first shelf, and, the upper and lower door portion and the first a second telescopic side frames are all adjusted to accommodate the spacing between the first shelf and the second shelf.

The present disclosure also teaches a self-closing door assembly for limiting access to goods in a shelving system that includes a first and second shelf for displaying the goods. The assembly include a frame assembly attached to the shelving system along the front edge of the first shelf, and a guide rail assembly that has a lower guide rail positioned attached to the frame assembly and aligned in parallel with the front edge of the first shelf, and an upper guide rail located above the first guide rail. The assembly includes a first door with a first lower door portion and a first upper door portion attached to one another in height adjustable fashion to enable adjustment of the first door height according to the shelving system shelf spacing, and that is aligned to laterally engage the guide rail assembly to slide between a closed position that interferes with manual access to the goods displayed on the first shelf and an open position that enables manual access to a first fractional portion of the goods displayed on the first shelf. The assembly also includes a second door with a second lower door portion and a second upper door portion attached to one another in height adjustable fashion to enable adjustment of the second door height according to the shelving system shelf spacing, and aligned to laterally engage the guide rail assembly to slide between a closed position that interferes with manual access to the goods displayed on the first shelf and an open position that enables manual access to a second fractional portion of the goods displayed on the first shelf. And, where the first door and the second door are arranged in left-right opposing orientation. A first constant-force spring is retained in position by the frame assembly, and has an end clip that extends to engage the first door to urge the first door toward the closed position, and, a second constant-force spring retained in position by the frame assembly, with an end clip that extends to engage the second door to urge the second door toward the closed position. The first door and the second door are adapted for manual engagement to be urged toward the open positions, and the first and second springs return the first and second doors, respectively, toward the closed positions when released. The assembly further includes first and second end panels attached to left and right sides of the frame assembly, respectively, each extending rearwardly to limit access to goods upon the first shelf from left and right sides. The assembly further includes a first and second telescopic side frames that are height adjustable to accommodate a selected height of the lower and upper door portion.

In a specific embodiment, the foregoing assembly further includes a lower fastener fixed to the lower guide rail for connecting the lower guide rail to the first shelf, and an upper fastener fixed to the upper guide rail for connecting the upper guide rail to the first shelf, and where the upper and lower door portions and the first a second telescopic side frames are all adjusted to accommodate the spacing between the first shelf and the second shelf.

DESCRIPTION OF THE INVENTION

Figure 1:
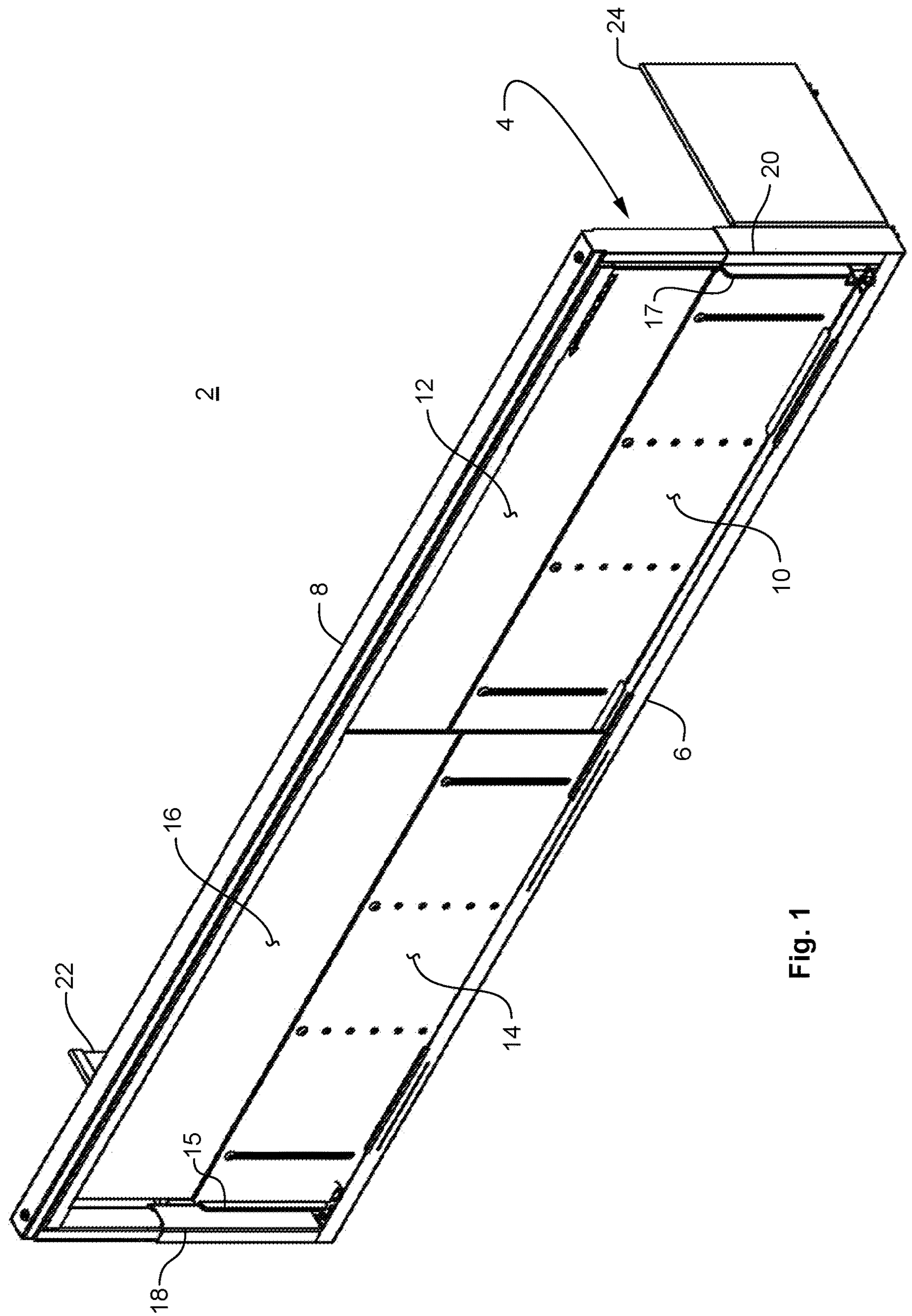
FIG. 1 is a front perspective view drawing of a self-closing door assembly according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present disclosure presents illustrative embodiments of self-closing door assemblies useful in retail shelving systems of various types. A typical retail shelf has a width, depth, and height, and, displays plural units of retail goods. Such shelving systems typically have a vertical structure, such as in a gondola shelving frame known to those skilled in the art, with plural shelves that are adjustable in height, enabling the retailer to adjust vertical shelf spacing to accommodate the goods to the displayed. Traditionally, these shelves enable wide open access to the goods displayed thereon. In a proper transaction, the consumer selects one or more items to purchase, leaving the remaining goods on the shelf. However, given the recent trends to mass larceny, there are individuals that wrongly take advantage of the open access by gathering a mass quantity of goods, perhaps all of the goods, and pushing them into some sort of container, then fleeing the scene and stealing the goods. In the industry, this is called "sweeping", and represents a substantial risk of loss to the retailers. As noted hereinbefore, there are known techniques for preventing this, but these require either more extensive access control by retail personal, or the use of complex and expensive display fixtures that meter out the goods under some mechanical or automated access control scheme.

The illustrative embodiments taught herein place a barrier in front of the goods, in the form of one or more sliding doors, which require the user to slide the door open with one hand, and retrieve the desired goods with the other hand. A prompt self-closing feature of the illustrative embodiment door prevents two-handed access to the goods. The present disclosures also teaches the use of two or more sliding doors on a single shelf unit, which limits open access to half, or less than half, of the goods by opening a single door. The doors may be arranged so that they overlap one-another when one is opened, making it impossible to access all the goods in an attempt to sweep them from the shelf. The self-closing door of the present disclosure is typically place along the front edge of the shelf, with the goods located behind. In the case where the shelving system also provide access from the sides of any given shelf, the present disclosure contemplates the use of end panels that prevent access to the good from the left and right sides of the shelf. In the case where the shelving system provides for vertical shelf spacing adjustment, the height of the self-closing door in the illustrative embodiment may be adjustable to accommodate the actual shelf spacing.

Reference is directed to FIG. 1, which is a front perspective view drawing of a self-closing door assembly 2 according to an illustrative embodiment of the present invention. A frame assembly 4 is comprised of several elements, including a lower guide rail 6, an upper guide rail 8, and a pair of left and right side frames 18, 20. Within the frame assembly 4, and between the upper guide rail 8 and the lower guide rail 6 are a pair of door assemblies 10, 12 on the right side and 14, 16 on the left side, which are laterally slidable along the upper guide rail 8 and the lower guide rail 6. In the illustrative embodiment, each door assembly is comprised of a lower door portion 10, 14 and an upper door portion 12, 16 that enable vertical height adjustment of each door. In this FIG. 1, the doors, 10, 12 and 14, 16, are adjusted to their maximum height, as illustrated. Left and right side panels 22, 24 extend rearwardly from the frame assembly 4 to control access from the left and right sides, respectively. Also note in this view that the left lower door portion 14 presents a tab 15 that is readily accessible for manual sliding of the left door 14, 16. Similarly, the right lower door portion 10 presents a tab 17 that is readily accessible for manual sliding of the right door 10, 12.

Figure 2:
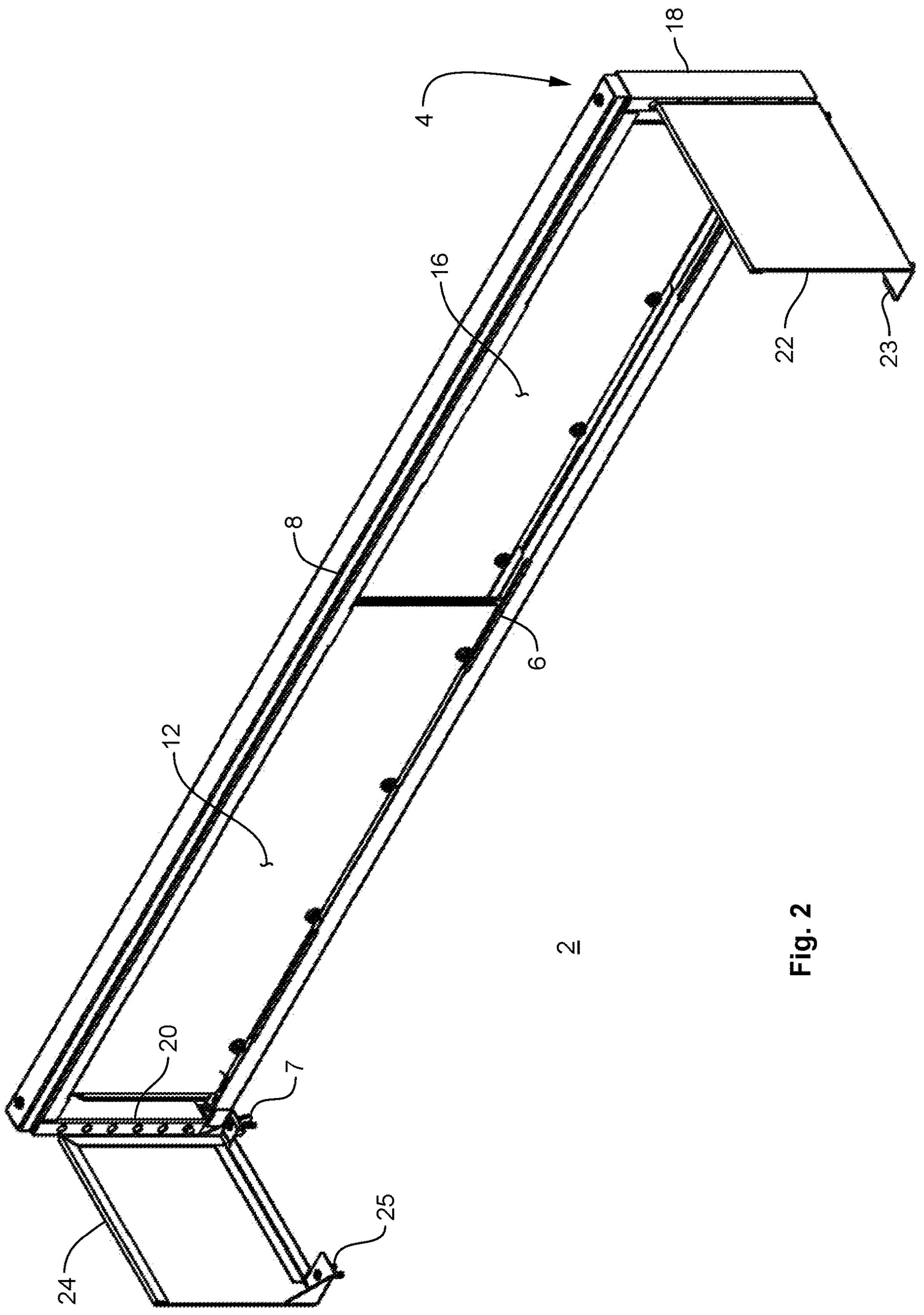
FIG. 2 is a rear perspective view drawing of a self-closing door assembly according to an illustrative embodiment of the present invention.

Reference is directed to FIG. 2, which is a rear perspective view drawing of a self-closing door assembly 2 according to an illustrative embodiment of the present invention. This view corresponds with FIG. 1, however, in FIG. 2 the self closing door assembly 2 is illustrated at its minimum height adjustment. The frame assembly 4 is comprised of a lower guide rail 6, and upper guide rail 8, and a pair of left and right side frames 18, 20. Within the frame assembly 4, and between the upper guide rail 8 and the lower guide rail 6 are a pair of door assemblies with the upper portions 12, 16 visible in this view. The left and right side panels 22, 24 extend rearwardly from the frame assembly 4 to control access from the left and right sides, respectively. Note that fasteners 23, 25 are provided for attachment of the end panels 22, 24 to the host shelving system (not shown). In the illustrative embodiment, threaded fasteners and wing nuts are used to connect to the host shelving system.

Figures 3A, 3B, 3C, 3D:
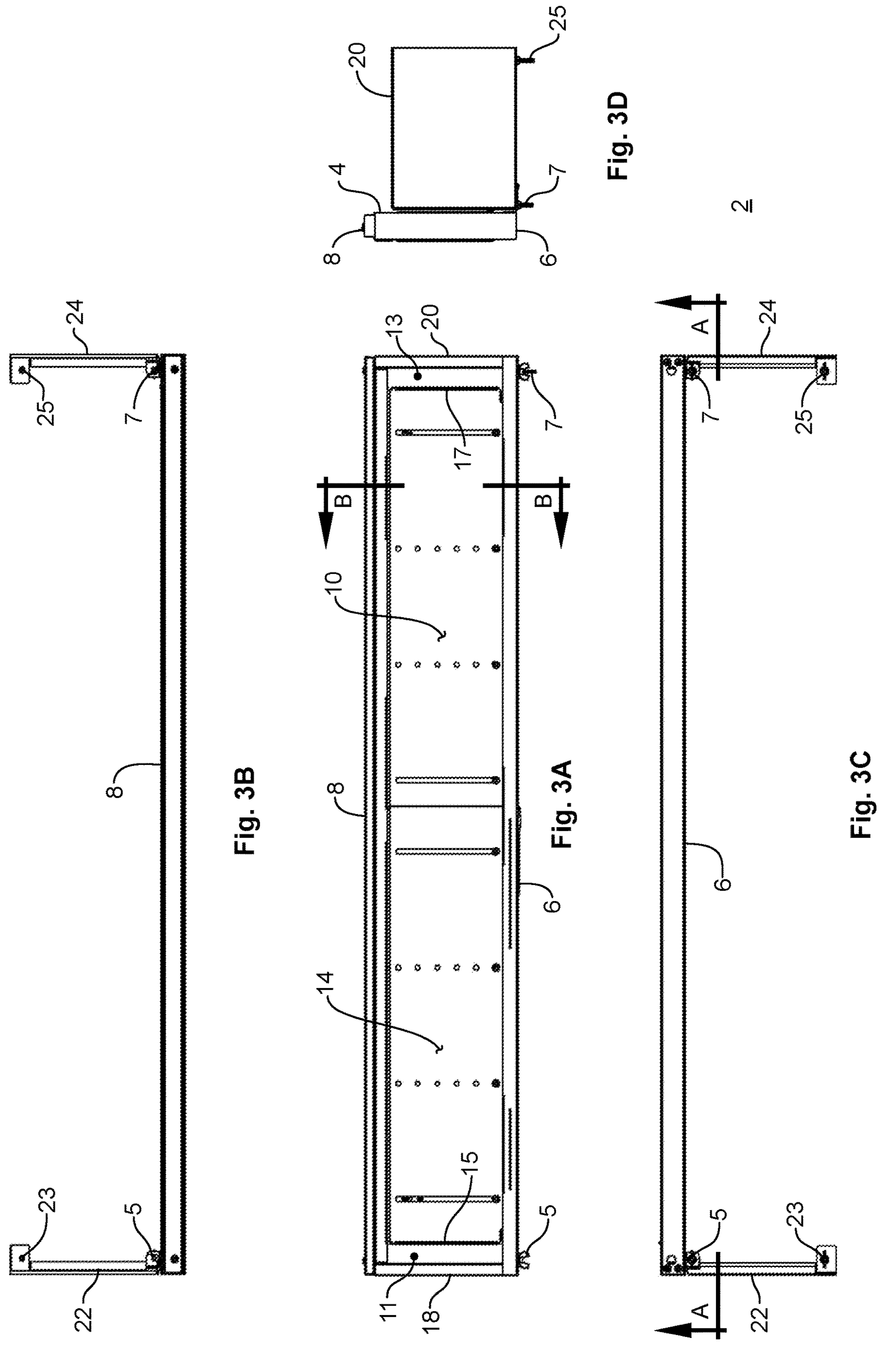
FIGS. 3A, 3B, 3C, and 3D are a front view drawing, a top view drawing, a bottom view drawing, and a side view drawing, respectively, of a self-closing door assembly according to an illustrative embodiment of the present invention.

Reference is directed to FIGS. 3A, 3B, 3C, and 3D, which are a front view drawing, a top view drawing, a bottom view drawing, and a side view drawing, respectively, of a self-closing door assembly 2 according to an illustrative embodiment of the present invention. In these views, the assembly 2 is illustrated at its lowest height adjustable range. In the front view 3A, the lower portion of the right door 10 and left door 14 are visible, supported between the lower guide rail 6 and the upper guide rail 8. The side frames 18 and 20 are disposed between these guide rails. Note that the finger tabs 15 on the left door and 17 on the right door are illustrated. Note further that a gap, 11 on the left and a gap 13 on the right, between the respective side frames 18, 20 and lower door portions 14, 10 is provided so that the user can easily use a finger to access the tabs 15, 17 to urge the doors open by sliding action. The top view 3B and bottom view 3C present the end panels 22, 24, as well as certain fasteners. These fasteners include threaded fasteners 23, 25 on the end panels 22, 24, respectively, for connection to the host shelving system (not shown). Similarly, the lower guide rail 6 includes threaded fasteners 5, 7 on the left side and right side, respectively, for attachment to the host shelving system as well. FIG. 3D presents a right hand side view of the self-closing door assembly 2, and illustrates the arrangement of the frame assembly 4, with its lower guide rail 6 ad upper guide rail 8, as well as the right side panel 20. In addition, the aforementioned fasteners 7, 25, as illustrated.

Figure 4:
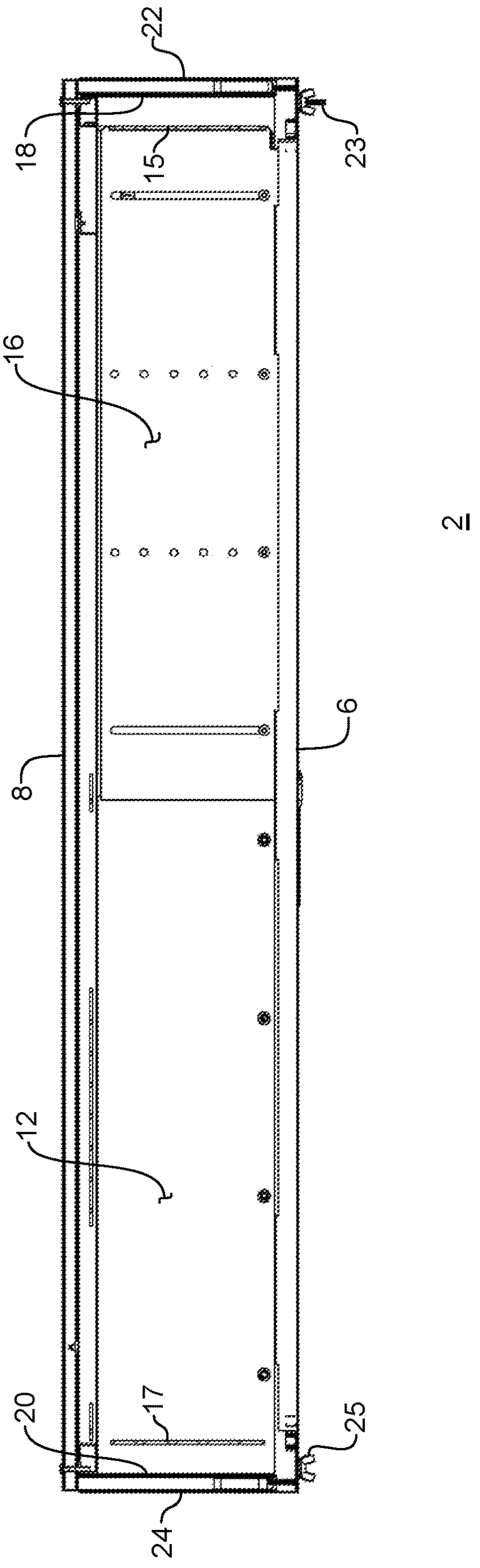
FIG. 4 is a front section view drawing of a self-closing door assembly according to an illustrative embodiment of the present invention.

Reference is directed to FIG. 4, which is a front section view drawing, Section A-A, of a self-closing door assembly 2 according to an illustrative embodiment of the present invention. Again, in this FIG. 4 the self closing door assembly 2 is illustrated at its minimum height adjustment. The frame assembly 4 is comprised of a lower guide rail 6, and upper guide rail 8, and a pair of left and right side frames 18, 20. Within the frame assembly 4, and between the upper guide rail 8 and the lower guide rail 6 are the pair of door assemblies with just the upper portions 12, 16 visible in this view. The left and right side panels 22, 24 extend rearwardly from the frame assembly 4 to control access from the left and right sides, respectively. Note that fasteners 23, 25 are provided for attachment of the end panels 22, 24 to the host shelving system (not shown). In the illustrative embodiment, threaded fasteners and wing nuts are used to connect to the host shelving system. Also note the finger tabs 15, 17, which extend from the lower door portions 16, 12, respectively, for proving convenient user access for opening the doors.

Figure 5:
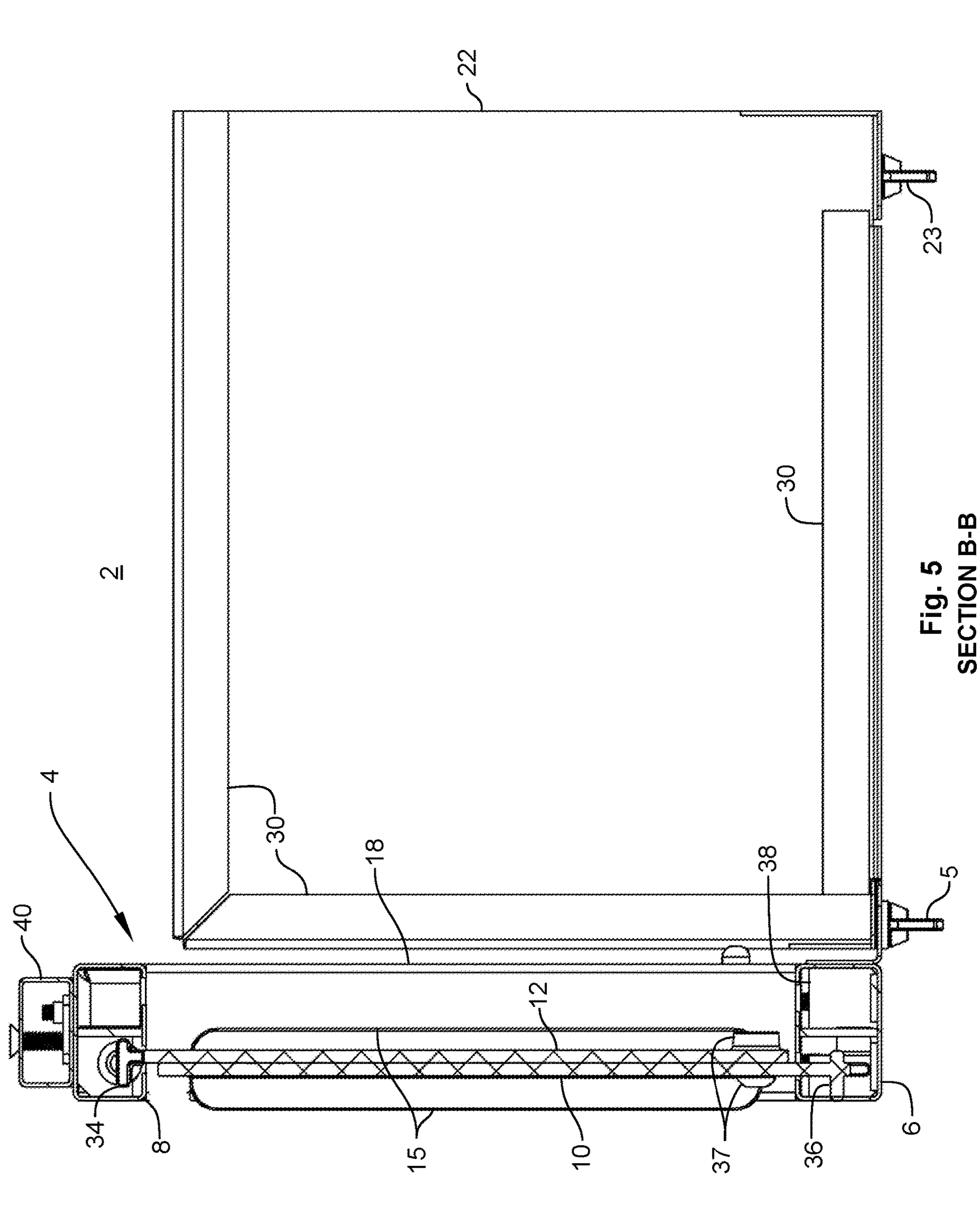
FIG. 5 is a side section view drawing of a self-closing door assembly according to an illustrative embodiment of the present invention.

Reference is directed to FIG. 5, which is a side section view drawing, Section B-B, of a self-closing door assembly 2 according to an illustrative embodiment of the present invention. Part of the frame assembly 4 is visible, including the lower guide rail 6, the upper guide rail 8, the left side frame member 18, a shelf attachment member 40 on top of the upper guide rail 8, and a threaded fastener 5 that extends from the lower guide rail 6, as illustrated. The lower left door portion 10 and upper left door portion 12 can been seen in section view. In the illustrative embodiment, the door portions 10, 12 are fabricated from injection molded transparent polycarbonate for strength and to enable product viewing without opening the doors. Note that the molded door portions 10, 12 include guide bosses 36, 34, respectively, which slide within the respective guide rails 6, 8, and serve to locate and retain the door portions within those respective guide rails, as illustrated. Also note the height adjustment fastener 37 used to join the upper and lower door portions 10, 12 after the desired height has been selected. Also note spring 38 located within the lower guide rail 6 portion of the frame assembly 4. In the illustrative embodiment, there are two springs, one for each side of the door upper-lower portion assemblies, which are coiled-strip type constant-force springs, such as the part number 1845N4 clip-on constant-force spring available from McMaster-Carr (see www.mcmaster.com). In this section view, the left side end panel 22 is also visible, and shows details of a folded edge 30 arrangement, which stiffens the steel end panel 22. A threaded fastener 23 extends from the side panel 22 for connection to the host shelving system (not shown).

Figure 6B:
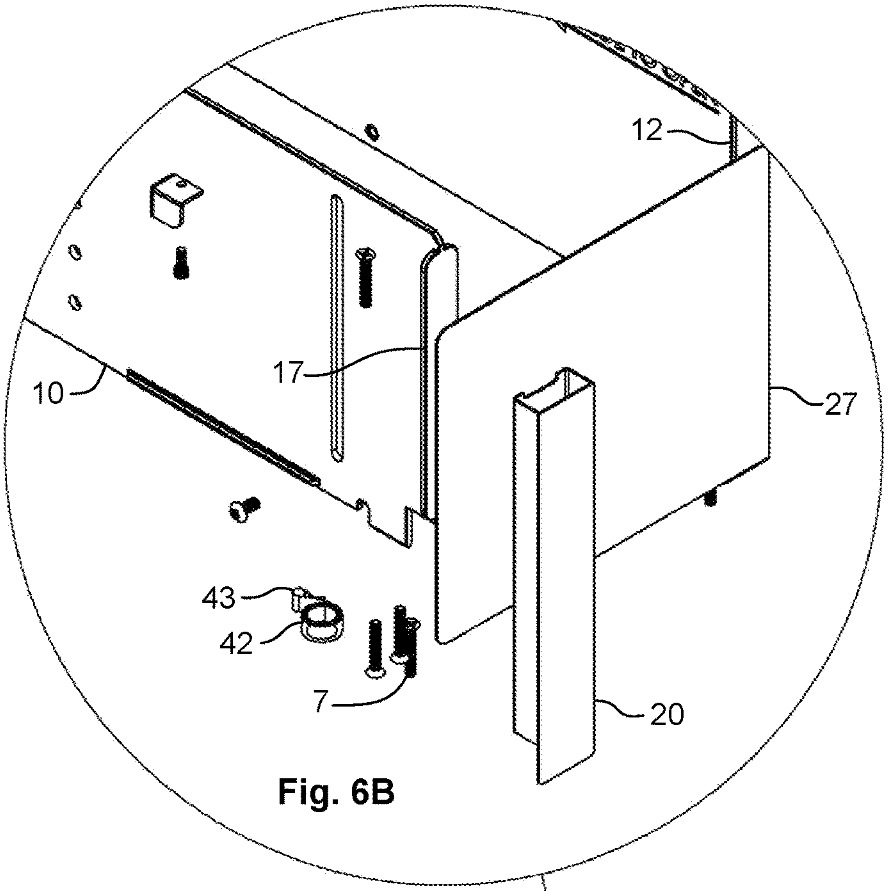
FIG. 6B is a detailed view of a portion of FIG. 6A, as illustrated, and according to an illustrative embodiment of the present invention.
Figure 6A:
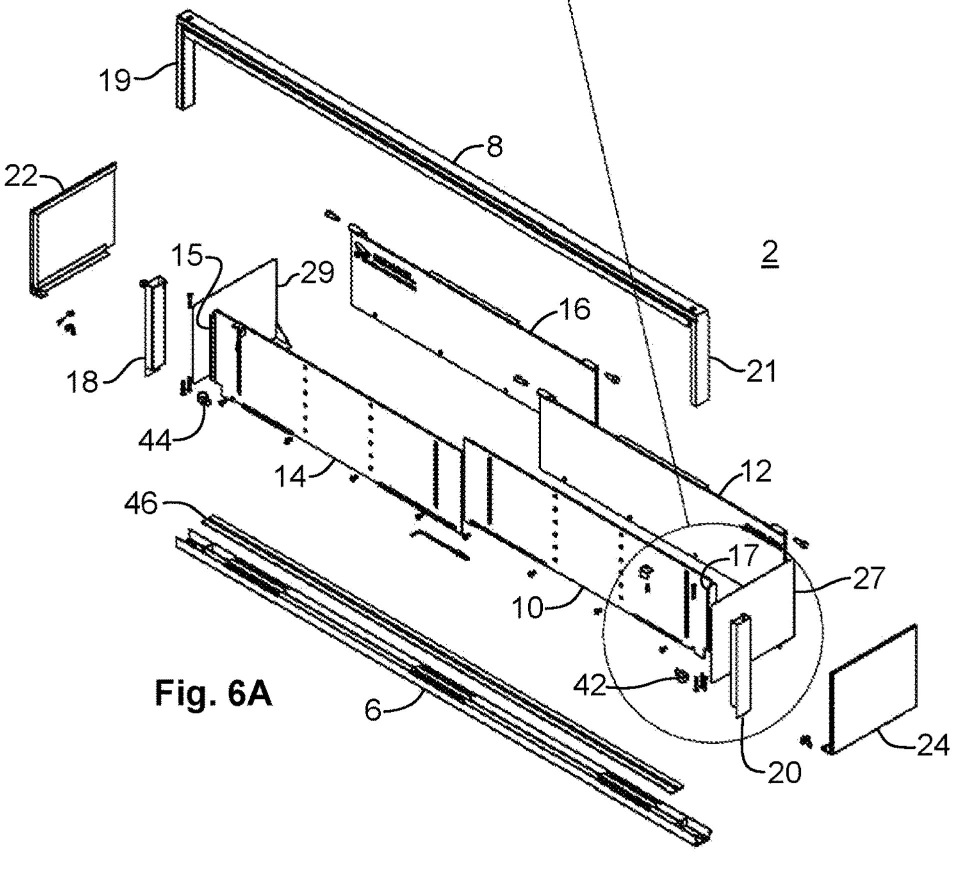
FIG. 6A is an exploded perspective view drawing of a self-closing door assembly.

Reference is directed to FIG. 6A and 6B, which are an exploded perspective view drawing and a corresponding detail drawing, respectively, of a self-closing door assembly 2 according to an illustrative embodiment of the present invention. These views show further elements and assembly details of the illustrative embodiment. The lower guide rail 6, upper guide rail 8, and both the left and right side frames 18, 20 are shown. But note the telescopic side frame members 19, 21 that are attached to the upper guide rail 8, and which are inserted into, and slidably engage the side frames 18, 20, respectively. This arrangement enables the aforementioned adjustable height feature of the illustrative embodiment. Also note the lower guide rail 6 divider 46, which serves to define separate guide paths for the left lower door portion 14 and the right lower door portion 10 as they traverse the guide rail 6. The upper left door portion 16 adjustably engages the lower left door portion 14, and, the upper right door portion 12 adjustably engages the lower right door portion 10, to thereby enable corresponding adjustment of the door height. The access tabs 15 of the lower left door portion and access tab 17 of the lower right door portion are also illustrated. These are molded together with the door panels during manufacture. Note also, the left constant-force spring 44 and the right constant-force spring 42, which are contained within the left and right ends, respectively, of the lower guide rail 6, and which extend to engage and urge their respective door portions 14, 10 to automatically close after being manually urged open by a user. The left end panel 22 and right end panel 24 are also illustrated. But note the inner left and right end panels 29, 27, respectively, which are provided to present a smooth and attractive interior surface within the protected shelf space. FIG. 6B provides finer details information, including the threaded fastener 7 for connection to the host shelf (not shown) and the right constant-force sprig 42 showing its door portion engaging clip extension 43.

Figure 7A:
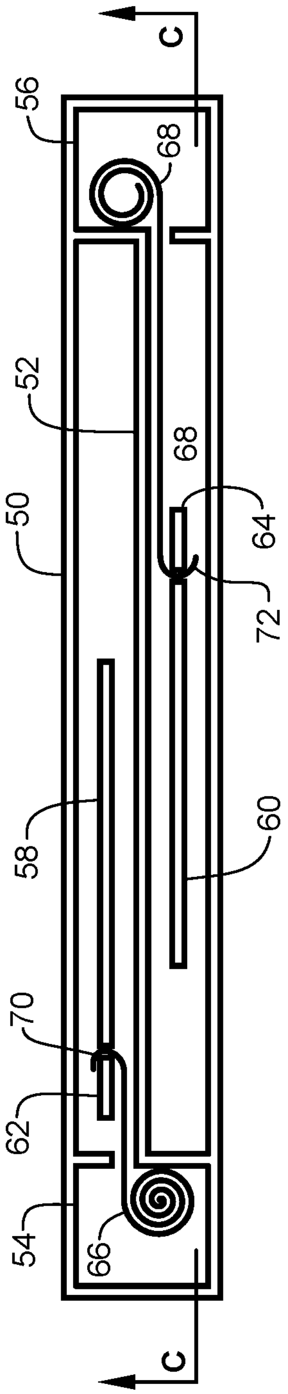
FIGS. 7A and 7B are a top view functional diagram and a front view functional diagram, respectively, of a self-closing door assembly according to an illustrative embodiment of the present invention.
Figure 7B:
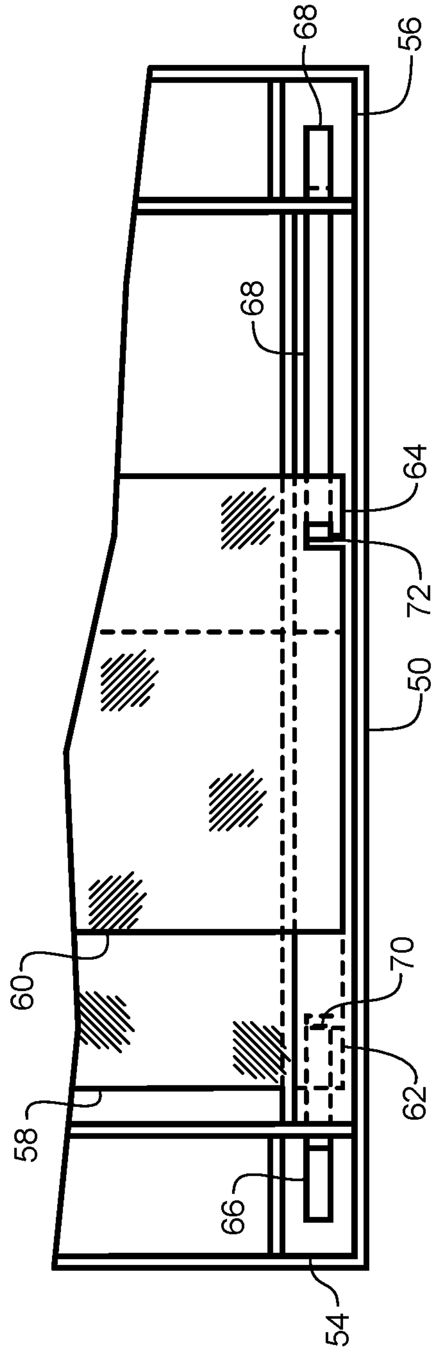

Reference is directed to FIG. 7A and 7B, which are a top view functional diagram and a front section view, Section C-C, functional diagram, respectively, of a self-closing door assembly according to an illustrative embodiment of the present invention. These views present a generic arrangement of the left and right door portions 58, 60, respectively, and their corresponding constant-force springs 66, 68, and how they are arranged in the lower guide rail 50. The lower guide rail 50 is divided into two section by divider 52 such that the left door portion 58 and right door portion 60 slide within separate guide channels, as illustrated. Left end compartment 54 retains left constant-force spring 66 therein. And, right end compartment 56 retains right constant-force spring 68 therein. The left spring 66 extends to a left clip 70 that engages a tab 62 on the left door 58, which thereby enables left constant-force spring 66 to urge the left door portion 58 back to its closed position after it is manually released by a user. Similarly, the right spring 68 extends to a right clip 72 that engages a tab 64 on the right door 60, which thereby enables right constant-force spring 68 to urge the right door portion 60 back to its closed position after it is manually released by a user.

Figure 8B:
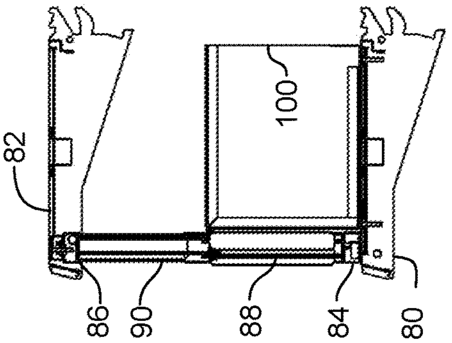
FIGS. 8A and 8B are a front view drawing and a side section view drawing, respectively, of a self-closing door assembly in an extended position according to an illustrative embodiment of the present invention.
Figure 8A:
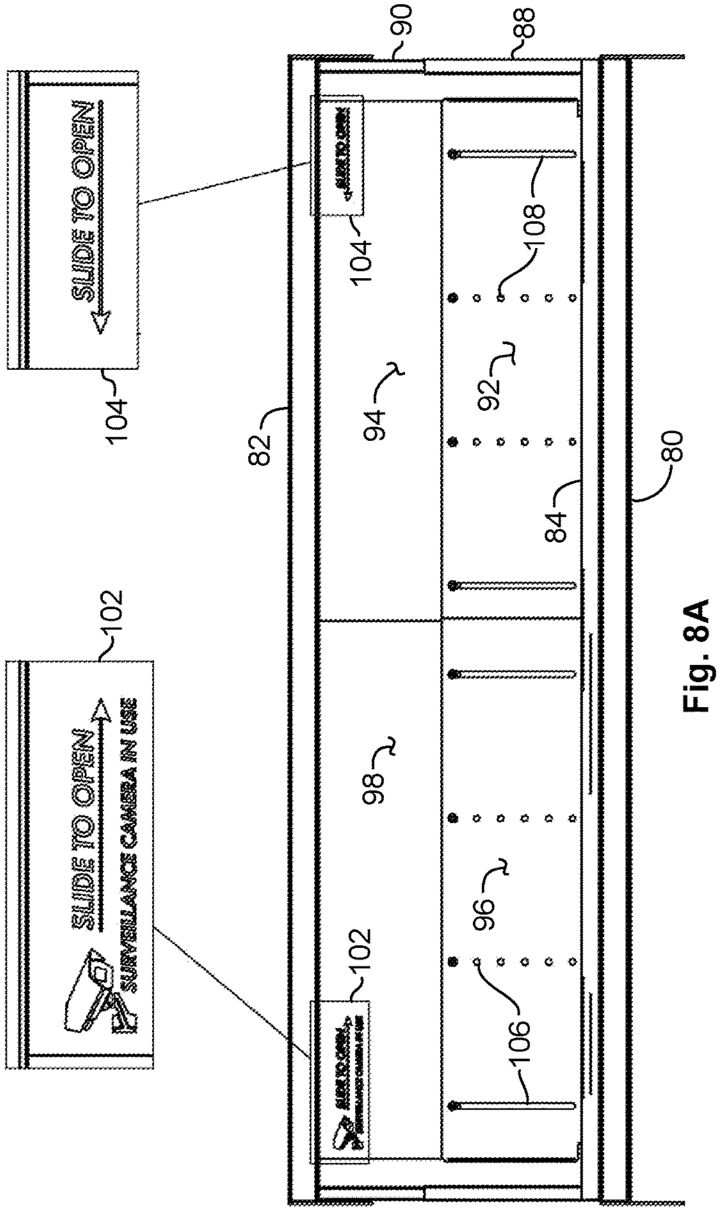

Reference is directed to FIG. 8A and 8B, which are a front view drawing and a side section view drawing, respectively, of a self-closing door assembly in an extended position and fixed to a shelving system according to an illustrative embodiment of the present invention. The shelving system comprises a lower shelf 80 and an upper shelf 82, as is typical in modern gondola shelving systems known to those skilled in the art. The self-closing door assembly includes the lower guide rail 84 and upper guide rail 86 that are fixed by threaded fasteners to the corresponding shelves 80, 82, as illustrated. Telescopic side frame 88, 90 on both sides of the assembly extend between the guide rails 80, 82 to accommodate the shelf spacing, as illustrated. Disposed between the guide rails 84, 86 is the door assembly comprising a lower left door portion 96 and an upper left door portion 98, as well as a lower right door portion 92 and an upper right door portion 94. The left door portions 96, 98 are adjustable joined by slots or rows of holes 106 using threaded fasteners (not shown), which are fixed at the desired height. Likewise, the right door portions 92, 94 are adjustable joined by slots or rows of holes 108 using threaded fasteners (not shown). Instructional graphics 102, 104 may be provided to instruct users on operation of the assembly. End panels 100 are also provided on the left and right side of the assembly, as illustrated. With this arrangement, the self-closing door assembly can be adjusted to accommodate the shelf 80, 82 spacing.

Figure 9B:
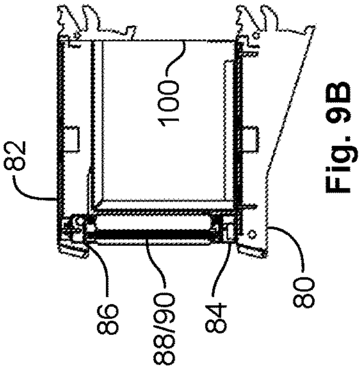
FIGS. 9A and 9B are a front view drawing and a side section view drawing, respectively, of a self-closing door assembly in a retracted position according to an illustrative embodiment of the present invention.
Figure 9A:
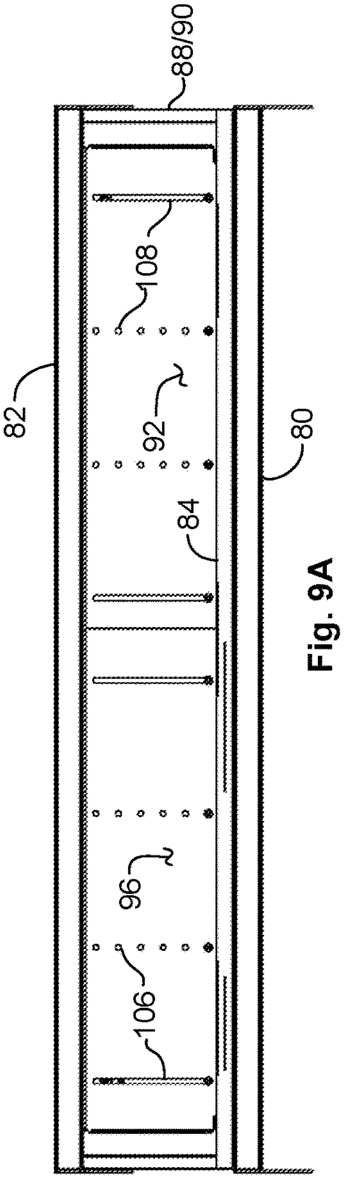

Reference is directed to FIG. 9A and 9B, which are a front view drawing and a side section view drawing, respectively, of a self-closing door assembly in a retracted position according to an illustrative embodiment of the present invention. These views correspond with those of FIGS. 8A and 8B. In FIGS. 9A and 9B, the shelving system comprises a lower shelf 80 and an upper shelf 82. The self-closing door assembly includes the lower guide rail 84 and upper guide rail 86 that are fixed by threaded fasteners to the corresponding shelves 80, 82, as illustrated. Telescopic side frame 88, 90 on both sides of the assembly extend between the guide rails 80, 82 to accommodate the shelf spacing, which is set to the minimum height in these views. Disposed between the guide rails 84, 86 is the door assembly comprising the aforementioned four door panels, with just the lower left door portion 96 and lower right door portion 92 visible in these views.

Figure 10:
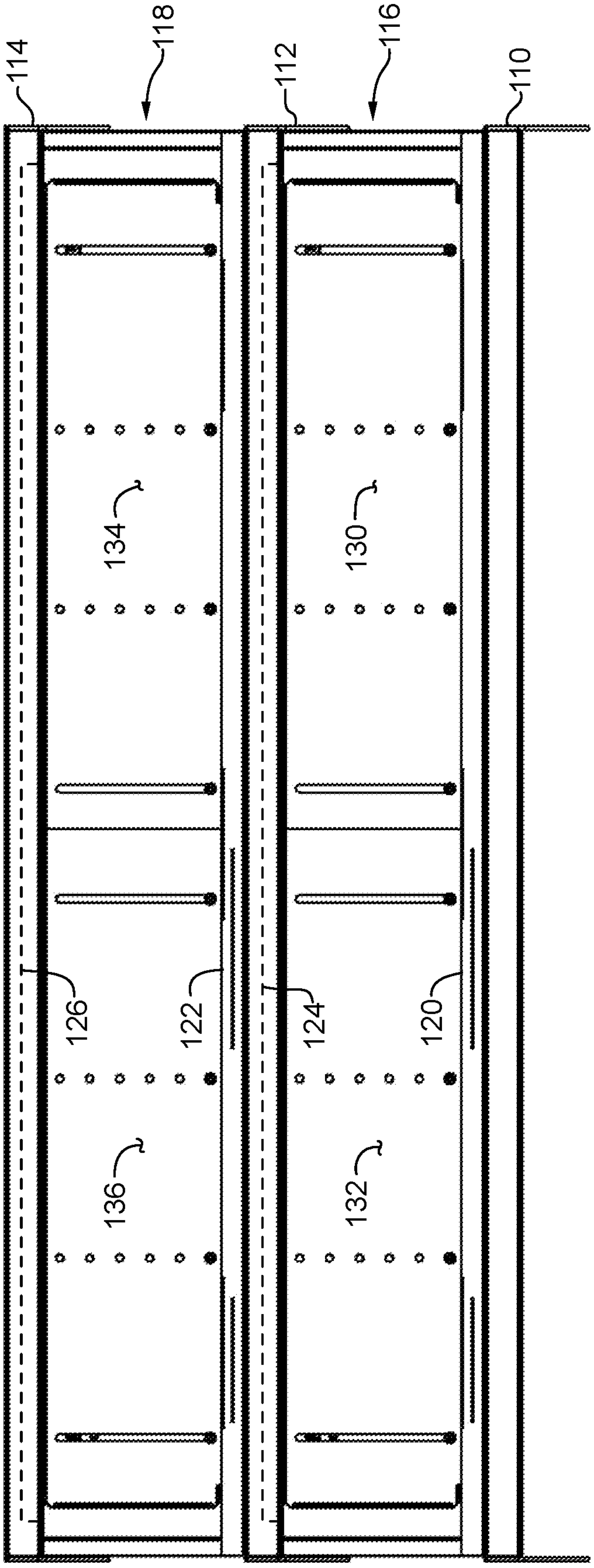
FIG. 10 is a front view drawing of a pair of self-closing door assemblies installed in a shelving system according to an illustrative embodiment of the present invention.

Reference is directed to FIG. 10, which is a front view drawing of a pair of self-closing door assemblies 116, 118 installed in a shelving system according to an illustrative embodiment of the present invention. This view presents the arrangement when the illustrative embodiment self-closing door assemblies are stacked into two shelves on a multiple shelf shelving system, as illustrated. Three shelves 110, 112, 114 support two self-closing door assemblies 116, 118 there-between. The lower assembly 116 includes a lower and upper guide rails 120, 124, respectively, and, the upper assembly 118 includes a lower and upper guide rail 122, 126, respectively, all of which are fastened to the adjacent shelves 110, 112, 114 using threaded fasteners. The lower assembly includes left door 132 and right door 130. Likewise, the upper assembly includes a left door 136 and right door 134.

Figure 11A:
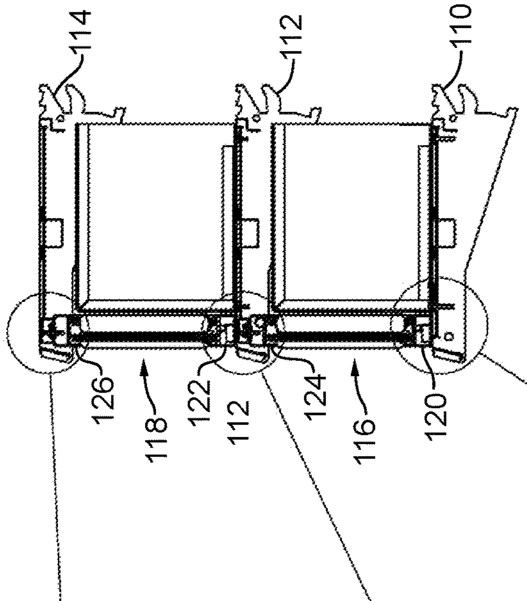
FIGS. 11A, 11B, 11C, and 11D are a side section view drawing and three detailed section view drawings, respectively, of a pair of a self-closing door assemblies installed in a shelving system according to an illustrative embodiment of the present invention.
Figure 11B:
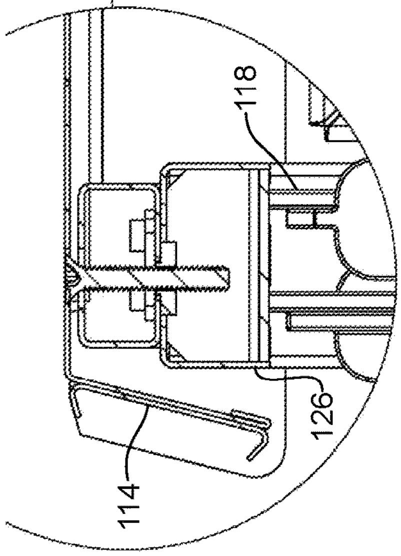
Figure 11C:
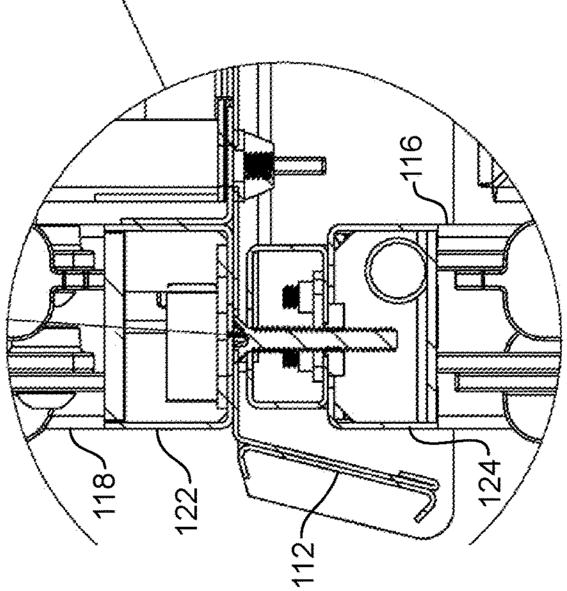
Figure 11D:
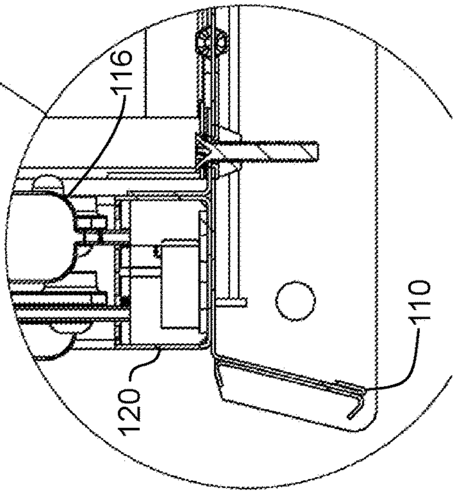

Reference is directed to FIG. 11A, 11B, 11C, and 11D, which are a side section view drawing and three detailed section view drawings, respectively, of a pair of a self-closing door assemblies 116, 118 installed in a shelving system according to an illustrative embodiment of the present invention. These figures correspond with FIGS. 10. In FIGS. 11A, B, C, and D, three shelves 110, 112, 114 support two self-closing door assemblies 116, 118 there-between. The lower assembly 116 includes a lower guide rail 120 fixed to the lower shelf 110 as illustrated in FIG. 11D. The lower assembly also includes and upper guide rail 124 fixed to the bottom of middle shelf 112 with threaded fasteners, as illustrated in FIG. 11C. Similarly, the upper assembly 118 includes a lower guide rail 122 fixed to the top of middle shelf 112, also as illustrated in FIG. 11C. The upper assembly 118 also includes and upper guide rail 126 fixed to the bottom of upper shelf 114 with threaded fasteners, as illustrated in FIG. 11B.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A self-closing door assembly for limiting access to goods in a shelving system that includes a first shelf and a second shelf for displaying the goods, the first shelf having a front edge, the assembly comprising:

a frame assembly adapted for fixed attachment to the shelving system adjacent the front edge of the first shelf;

a guide rail assembly including a lower guide rail positioned in fixed relationship to said frame assembly and aligned substantially in parallel with the front edge of the first shelf, and an upper guide rail located above said first guide rail;

a first door that includes a first lower door portion and a first upper door portion attached to one another in height adjustable fashion to enable adjustment of said first door height according to the shelving system shelf spacing between the first shelf and the second shelf, and that is aligned to laterally engage said guide rail assembly to thereby slide between a closed position that interferes with manual access to the goods displayed on the first shelf and an open position that enables manual access to a first fractional portion of the goods displayed on the first shelf, the first lower door portion and the first upper door portion including a first row of holes and a first vertically oriented, elongated slot spaced from the first row of holes, with a first fastener disposed through at least one hole in the first row of holes, and a second fastener disposed through the first elongated slot to fix the first lower door portion and the first upper door portion at a selected first door height;

a second door that includes a second lower door portion and a second upper door portion attached to one another in height adjustable fashion to enable adjustment of said second door height according to the shelving system shelf spacing, and aligned to laterally engage said guide rail assembly to thereby slide between a closed position that interferes with manual access to the goods displayed on the first shelf and an open position that enables manual access to a second fractional portion of the goods displayed on the first shelf, the second lower door portion and the second upper door portion including a second row of holes and a second vertically oriented, elongated slot spaced from the second row of holes, with a third fastener disposed through at least one hole in the second row of holes, and a fourth fastener disposed through the second elongated slot to fix the second lower door portion and the second upper door portion at a selected second door height, said first door and said second door arranged in left-right opposing orientation;

a first constant-force spring retained in position by said frame assembly, and having an end clip extended to engage said first door to urge said first door toward said closed position;

a second constant-force spring retained in position by said frame assembly, and having an end clip extended to engage said second door to urge said second door toward said closed position, wherein said first door and said second door are adapted for manual engagement to be urged toward said open positions, and wherein said first and second springs return said first and second doors, respectively, toward said closed positions upon manual release thereof; first and second end panels fixed to left and right sides of said frame assembly, respectively, each extending rearwardly to limit access to goods upon the first shelf from left and right sides thereof;

a first telescopic side frame that is height adjustable to accommodate the selected first door height of said first lower door portion attached to said first upper door portion, and a second telescopic side frame that is height adjustable to accommodate the selected second door height of said second lower door portion attached to said second upper door portion, wherein the first constant-force spring winds in a first coil that is disposed laterally beyond a first end of the first door in the closed position, wherein the second constant-force spring winds in a second coil that is disposed laterally beyond a second end of the second door in the closed position, wherein the first door and the second door are disposed between and move between the first coil and the second coil in transitioning from the respective closed position to the open position.

2. The assembly of claim 1 comprising:

a lower fastener fixed to said lower guide rail for connecting said lower guide rail to the first shelf, and an upper fastener fixed to said upper guide rail for connecting said upper guide rail to the first shelf, and wherein said upper and lower door portions and said first a second telescopic side frames are all adjusted to accommodate the spacing between the first shelf and the second shelf.

3. The assembly of claim 1, wherein the first constant-force spring includes an end clip distal from the first coil, the end clip forming a first tubular element, wherein a clip fastener extends through the first tubular element and is joined with the first door to secure the first constant-force spring to the first door.

4. A self-closing door assembly for limiting access to goods in a shelving system that includes a first shelf for displaying the goods, the first shelf having a front edge, the assembly comprising:

a frame assembly adapted for fixed attachment to the shelving system adjacent the front edge of the first shelf, the frame assembly including a first vertical frame defining an internal compartment and an opening;

a guide rail assembly positioned in fixed relationship to said frame assembly and aligned substantially in parallel with the front edge of the first shelf;

a first door aligned to laterally engage said guide rail assembly to thereby slide between a closed position that interferes with manual access to the goods displayed on the first shelf and an open position that enables manual access to a first fractional portion of the goods displayed on the first shelf;

a first spring disposed between said frame assembly and said first door to urge said first door toward said closed position, wherein said first door is adapted for manual engagement to be urged toward said open position, and said first spring returns said first door to said closed position upon manual release thereof, wherein the first spring is a coiled-strip constant-force spring retained in position by said frame assembly, and having an end clip extended to engage said first door, wherein the first spring winds into a first coil, wherein the first coil is disposed in the internal compartment and includes a first portion that extends through the opening defined by the first vertical frame so as to extend out from the internal compartment toward the first door.

5. The assembly of claim 4, wherein said guide rail assembly comprises:

a lower guide rail that slidably engages a lower portion of said first door, and an upper guide rail that slidably engages an upper portion of said first door.

6. The assembly of claim 4 comprising:

first and second end panels fixed to left and right sides of said frame assembly, respectively, each extending rearwardly to limit access to goods upon the first shelf from left and right sides thereof.

7. The assembly of claim 4 comprising:

a second door aligned to laterally engage said guide rail assembly to thereby slide between a closed position that interferes with manual access to the goods displayed on the first shelf and an open position that enables manual access to a second fractional portion of the goods displayed on the first shelf;

a second spring disposed between said frame assembly and said second door to urge said second door toward said closed position, wherein said second door is adapted for manual engagement to be urged toward said open position, and said second spring returns said second door to said closed position upon manual release thereof.

8. The assembly of claim 7, wherein said first door overlaps with said second door when urged open, and wherein said second door overlaps with said first door when urged open.

9. The assembly of claim 7, wherein said first door and said second door are arranged in left-right opposing orientation, and wherein said guide rail assembly includes a first guide rail engaged with said first door, and a second guide rail engaged with said second door.

10. The assembly of claim 7, wherein said first door includes a first lower door portion and a first upper door portion attached to one another in height adjustable fashion to enable adjustment of said first door height according to the shelving system shelf spacing, and said second door includes a second lower door portion and a second upper door portion attached to one another in height adjustable fashion to enable adjustment of said second door height according to the shelving system shelf spacing.

11. The assembly of claim 10, wherein said frame assembly comprises:

a first telescopic side frame that is height adjustable to accommodate a selected height of said first lower door portion attached to said first upper door portion, and a second telescopic side frame that is height adjustable to accommodate a selected height of said second lower door portion attached to said second upper door portion, wherein said guide rail assembly further includes a lower guide rail that slidably engages said first lower door portion and said second lower door portion, and an upper guide rail that slidably engages said first upper door portion and said second upper door portion.

12. The assembly of claim 11 comprising:

a lower fastener fixed to said lower guide rail for connecting said lower guide rail to the first shelf.

13. The assembly of claim 12, wherein the shelving system includes a second shelf located above the first shelf, and the assembly comprises:

an upper fastener fixed to said upper guide rail for connecting said upper guide rail to the first shelf, wherein said upper and lower door operations and said first a second telescopic side frames are all adjusted to accommodate the spacing between the first shelf and the second shelf.

14. The assembly of claim 4, wherein the first portion ends at an end clip distal from the first coil, the end clip forming a first tube, wherein a clip fastener extends through the first tube and is joined with the first door to secure the first spring to the first door.

15. A self-closing door assembly for limiting access to goods in a shelving system that includes a first shelf for displaying the goods, the first shelf having a front edge, the assembly comprising:

a frame assembly adapted for fixed attachment to the shelving system adjacent the front edge of the first shelf, the frame assembly including a first vertical frame defining an internal compartment;

a guide rail assembly positioned in fixed relationship to said frame assembly and aligned substantially in parallel with the front edge of the first shelf;

a first door aligned to laterally engage said guide rail assembly to thereby slide between a closed position that interferes with manual access to the goods displayed on the first shelf and an open position that enables manual access to a first fractional portion of the goods displayed on the first shelf, the first door including a first lower door portion and a first upper door portion joined in a height adjustable fashion, the first lower door portion and the first upper door portion including a first row of holes and a first vertically oriented, elongated slot spaced from the first row of holes, with a first fastener disposed through at least one hole in the first row of holes, and a second fastener disposed through the first elongated slot to fix the first lower door portion and the first upper door portion at a selected first door height;

a first spring disposed between said frame assembly and said first door to urge said first door toward said closed position, wherein said first door is adapted for manual engagement to be urged toward said open position, and said first spring returns said first door to said closed position upon manual release thereof, wherein the first spring includes a constant-force spring and a portion extended to engage said first door, wherein the first spring winds into a first coil, wherein the first coil is disposed laterally beyond a first end of the first door when the first door is in the closed position.

16. The assembly of claim 15, wherein the first coil is disposed in the internal compartment and the portion extends through an opening defined by the first vertical frame to extend from the internal compartment to the first door.

17. The assembly of claim 15, wherein the portion ends at an end clip distal from the first coil, the end clip forming a first tube, wherein a clip fastener extends through the first tube and is joined with the first door to secure the first spring to the first door.

18. The assembly of claim 15 comprising:

a second door that includes a second lower door portion and a second upper door portion attached to one another in height adjustable fashion to enable adjustment of said second door height, and aligned to laterally engage said guide rail assembly to thereby slide between a closed position and an open position, the second lower door portion and the second upper door portion including a second row of holes and a second vertically oriented, elongated slot spaced from the second row of holes, with a third fastener disposed through at least one hole in the second row of holes, and a fourth fastener disposed through the second elongated slot to fix the second lower door portion and the second upper door portion at a selected second door height, the first door and the second door arranged in left-right opposing orientation;

a second spring joined with the second door to urge the second door toward the closed position, wherein the first door and the second door are disposed between and move between the first spring and the second spring in transitioning from the respective closed position to the open position.

* * * * *